(12) United States Patent
Mallis et al.

(10) Patent No.: US 7,988,205 B2
(45) Date of Patent: Aug. 2, 2011

(54) WEDGE THREAD WITH TORQUE SHOULDER

(75) Inventors: David Llewellyn Mallis, The Woodlands, TX (US); Harris A. Reynolds, Jr., Houston, TX (US)

(73) Assignee: Hydril Company, Houston, TX (US)

( * ) Notice: Subject to any disclaimer, the term of this patent is extended or adjusted under 35 U.S.C. 154(b) by 0 days.

(21) Appl. No.: 12/691,465

(22) Filed: Jan. 21, 2010

(65) Prior Publication Data

US 2010/0181763 A1   Jul. 22, 2010

Related U.S. Application Data (63) Continuation of application No. 09/977,746, filed on Oct. 15, 2001, now Pat. No. 7,690,696, which is a continuation-in-part of application No. 09/294,889, filed on Apr. 19, 1999, now abandoned.

(51) Int. Cl.
*F16L 25/00* (2006.01)

(52) U.S. Cl. .................. 285/334; 285/333

(58) Field of Classification Search .......... 285/333, 285/334, 390, 355
See application file for complete search history.

(56) References Cited

U.S. PATENT DOCUMENTS

| | | | | |
|---|---|---|---|---|
| 2,006,520 | A | * | 7/1935 | Stone et al. ................ 285/334 |
| 2,239,942 | A | | 4/1941 | Stone et al. |
| 2,258,066 | A | * | 10/1941 | Oyen ........................ 285/334 |
| 2,992,019 | A | * | 7/1961 | MacArthur ................ 285/334 |
| 3,359,013 | A | | 12/1967 | Knox et al. |
| 3,856,337 | A | * | 12/1974 | Ehm et al. .................. 285/334 |
| 3,870,351 | A | * | 3/1975 | Matsuki .................... 285/334 |
| RE30,647 | E | | 6/1981 | Blose |
| 4,373,754 | A | * | 2/1983 | Bollfrass et al. ............ 285/334 |
| 4,521,042 | A | * | 6/1985 | Blackburn et al. .......... 285/334 |
| 4,600,224 | A | * | 7/1986 | Blose ........................ 285/334 |
| 4,707,001 | A | * | 11/1987 | Johnson .................... 285/334 |
| 4,822,081 | A | * | 4/1989 | Blose ........................ 285/334 |
| RE34,467 | E | | 12/1993 | Reeves |
| 5,454,605 | A | * | 10/1995 | Mott ......................... 285/333 |
| 5,462,315 | A | | 10/1995 | Klementich |
| 6,045,165 | A | * | 4/2000 | Sugino et al. .............. 285/333 |
| 6,123,368 | A | * | 9/2000 | Enderle ..................... 285/334 |
| 6,174,001 | B1 | * | 1/2001 | Enderle ..................... 285/334 |
| 6,206,436 | B1 | * | 3/2001 | Mallis ....................... 285/334 |
| 6,270,127 | B1 | * | 8/2001 | Enderle ..................... 285/334 |
| 6,322,110 | B1 | * | 11/2001 | Banker et al. .............. 285/334 |

* cited by examiner

*Primary Examiner* — David E Bochna
(74) *Attorney, Agent, or Firm* — Osha Liang LLP (57) ABSTRACT

A threaded pipe connection includes a pin member having an external thread increasing in width in one direction, a box member having an internal thread increasing in width in an opposite direction so that complementary internal and external threads move into engagement upon make-up of the connection, and at least one contact zone in which the pin member and box member are in sealed contact.

6 Claims, 6 Drawing Sheets

WEDGE THREAD WITH TORQUE SHOULDER

CROSS-REFERENCE TO RELATED APPLICATIONS

The present application is a continuation of U.S. patent application Ser. No. 09/977,746, filed on Oct. 15, 2001, now issued as U.S. Pat. No. 7,690,696, assigned to the assignee of the present application and incorporated herein by reference in its entirety. The former application was a continuation-in-part of U.S. patent application Ser. No. 09/294,889, filed on Apr. 19, 1999, now abandoned.

BACKGROUND

1. Field of the Disclosure

Embodiments disclosed herein relate generally to threaded tubular joints usable in oil and gas well drilling and production, such as tubing, casing, line pipe, and drill pipe, commonly known collectively as oilfield tubular goods. More particularly, the invention relates to wedge thread having a positive stop torque shoulder for connecting male (pin) and female (box) members.

2. Background Art

The use of threaded tubular connections for joining flow conduits in an end-to-end relationship to form a continuous flow path for transporting fluid under pressure is well known. Oilfield tubular goods all use threaded connections for connecting adjacent sections of conduit or pipe. Examples of such threaded end connections designed for use on oilfield tubular goods are disclosed in U.S. Pat. Nos. 2,239,942; 2,992,019; 3,359,013; RE 30,647; and RE 34,467, all of which are assigned to the assignee of the present invention.

Prior art wedge thread designs offer distinct advantages over other thread designs which include high torsion, high compression, and reliable internal and external pressure sealing capabilities. There are, however, a few issues that require extreme care when designing connection using wedge thread technology. A first issue is designing connections using metal-to-metal sealing interfaces in conjunction with wedge thread technology. A second issue is the inherent wear characteristics encountered during multiple make and breaks associated with wedge thread technology. The primary problem encountered when trying to incorporate a wedge thread with a conical metal-to-metal seal in the prior art is that a very shallow seal angle is required to compensate for the linear variability of the wedge thread torque stop. This invention incorporates a positive stop torque shoulder in conjunction with the wedge thread, which allows for better axial control of the connection at final make up without sacrificing existing advantages of the wedge thread technology. This better controlled axial location of the connection allows for a steeper metal-to-metal seal angle, thus enhancing characteristics of sealability and galling resistance. The second problem encountered using wedge thread technology is determining when the wedge thread begins to wear to a point that the connection is no longer serviceable as a result of repeated make and breaks. By incorporating a secondary positive stop torque shoulder within the primary wedge thread torque stop configuration, connection wear limitations can be better controlled.

SUMMARY OF THE DISCLOSURE

In one aspect, embodiments disclosed herein relate to a threaded pipe connection including a pin member having an external thread increasing in width in one direction, a box member having an internal thread increasing in width in an opposite direction so that complementary internal and external threads move into engagement upon make-up of the connection, and at least one contact zone in which the pin member and box member are in sealed contact.

Other aspects and advantages of the invention will be apparent from the following description and the appended claims.

DETAILED DESCRIPTION

Figure 1:
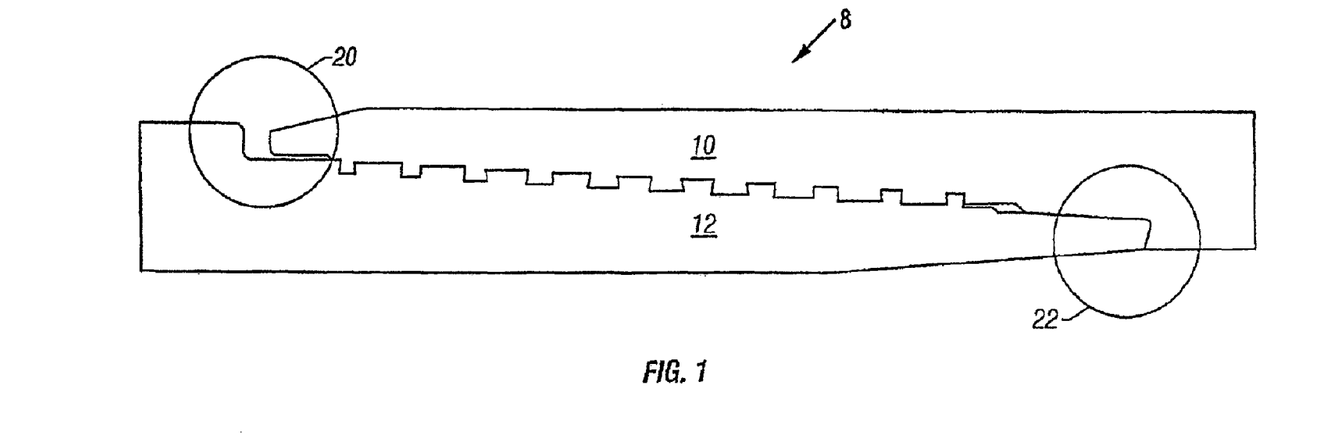
FIG. 1 is a side view of a one-step wedge thread form in accordance with embodiments of the present disclosure.
Figure 2:
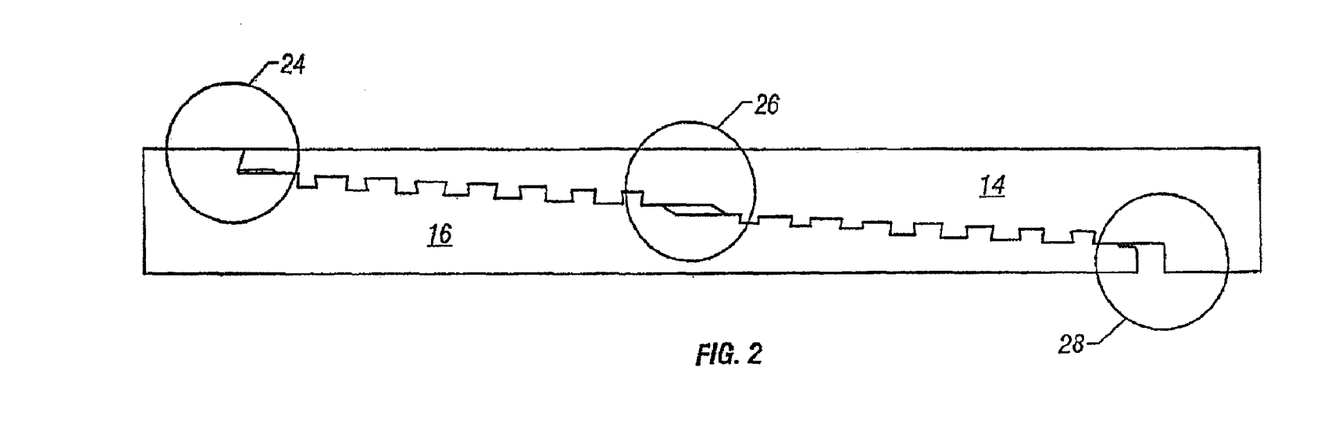
FIG. 2 is a side view of a two-step wedge thread form in accordance with embodiments of the present disclosure.
Figure 3:
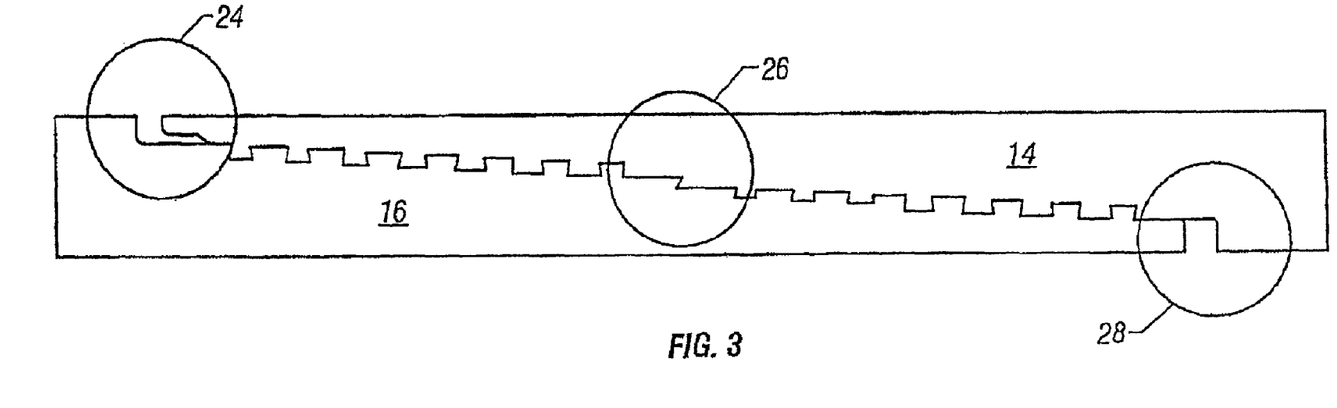
FIG. 3 is a side view of a two-step wedge thread form in accordance with embodiments of the present disclosure.

Referring to the drawings wherein like reference characters are used for like parts throughout the several views, FIGS. 1-3 illustrate a cross section of the wedge thread of a pin member and a box member in accordance with embodiments of the invention. As shown in FIG. 1, in one embodiment, the invention is a one-step wedge thread form with a positive stop torque shoulder. The positive stop torque shoulder can be located at the interface of the pin nose/box inner diameter (ID) shoulder, as shown in FIG. 1, or located at the interface of the box face/pin outer diameter (OD) shoulder.

Connection 8 includes a box member 10 and a pin member 12. Box member 10 has a tapered, internal, generally dovetail-shaped thread structure formed thereon and adapted for engaging complementary tapered, external, generally dovetail-shaped thread structure formed on pin member 12 to mechanically secure the box and pin members in a releasable manner.

Internal thread of box member 10 has stab flanks, load flanks, roots, and crests. The thread increases in width progressively at a uniform rate in one direction substantially the entire helical length of thread. External thread of pin member 12 has stab flanks, load flanks, roots, and crests. The thread increases in width progressively at a uniform rate in the other direction substantially the entire helical length of thread. The oppositely increasing thread widths and the taper of threads, cause the complementary roots and crests of the respective threads to move into engagement during make-up of the connection. Root and crest engagement is followed by the moving of complementary stab and load flanks into engagement upon make-up of the connection. The moving of complementary flanks, roots and crests into engagement forms sealing surfaces that resist the flow of fluids between the threads. A positive stop torque shoulder is located at either the interface of the box face/pin OD shoulder 20 or the pin nose/box ID shoulder 22. The type of torque shoulder used and the sealing mechanisms associated with the connection will be discussed in detail below with reference to FIGS. 4a-d, 5a-e, and 6a-f.

The positive stop torque shoulder moves into engagement upon make-up of the connection. The positive stop torque shoulder engagement may occur simultaneously with the stab and load flanks moving into engagement. Alternatively, the stab and load flanks may move into engagement after root and crest engagement during make-up of the connection and followed by the positive stop torque shoulder engagement upon make-up of the connection.

The pin member 12 or the box member 10 defines the longitudinal axis of the made-up connection. The roots and crests of the box and pin members are flat and parallel to the longitudinal axis of the connection and have sufficient width to prevent any permanent deformation of the threads when the connection is made up.

In one embodiment, the invention is a two-step wedge thread form with a positive stop torque shoulder. As shown in FIGS. 2 and 3, the positive stop torque shoulder can be located at the interface of the box face/pin OD shoulder 24, located at the interface between the two thread steps 26, or located at the interface of the pin nose/box ID shoulder 28.

Referring to FIG. 2, connection 8 includes a box member 14 and a pin member 16. Box member 14 has two thread steps each having a tapered, internal, generally dovetail-shaped thread structure formed thereon and adapted for engaging complementary tapered, external, generally dovetail-shaped thread structure formed on the two thread steps of pin member 16 to mechanically secure the box and pin members in a releasable manner.

Internal thread on each step of box member 14 has stab flanks, load flanks, roots, and crests. The thread increases in width progressively at a uniform rate in one direction substantially the entire helical length of thread. External thread on each step of pin member 16 has stab flanks, load flanks, roots, and crests. The thread increases in width progressively at a uniform rate in the other direction substantially the entire helical length of thread. The oppositely increasing thread widths and the taper of threads, cause the complementary roots and crests of the respective threads to move into engagement during make-up of the connection. Root and crest engagement is followed by the moving of complementary stab and load flanks into engagement upon make-up of the connection. The moving of complementary flanks, roots and crests into engagement forms sealing surfaces that resist the flow of fluids between the threads. One or more positive stop torque shoulders may be located at the box face/pin OD 24, the pin/box interface between the two thread steps 26, or the pin nose/box ID 26.

The one or more positive stop torque shoulders move into engagement upon make-up of the connection. The positive stop torque shoulder engagement may occur simultaneously with the stab and load flanks moving into engagement. Alternatively, the stab and load flanks may move into engagement after root and crest engagement during make-up of the connection and followed by the positive stop torque shoulder engagement upon make-up of the connection.

The pin member 16 or the box member 14 defines the longitudinal axis of the made-up connection. The roots and crests of the box and pin members are flat and parallel to the longitudinal axis of the connection and have sufficient width to prevent any permanent deformation of the threads when the connection is made up.

Those skilled in the art will appreciate that additional embodiments can be configured with combinations of multiple positive stop torque shoulders as specified above. It is also understood that additional embodiments can be configured with conical metal-to-metal seals or combinations of conical metal-to-metal seals located at the pin nose/box ID interface, the pin/box mid section interface and the box face/pin OD interface in combination with all applicable wedge thread and positive stop torque shoulder options. Exemplary detailed embodiments are described below with reference to FIGS. 4a-d, 5a-e, and 6a-f.

Figure 4A:
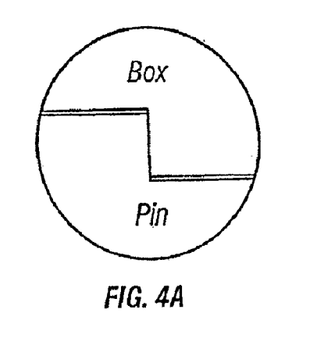
FIG. 4a shows a torque shoulder in accordance with embodiments of the present disclosure.
Figure 4B:
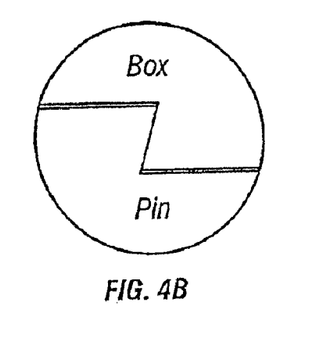
FIG. 4b shows a torque shoulder in accordance with embodiments of the present disclosure.

Thread forms in accordance with embodiments of the invention may incorporate torque shoulders, metal-to-metal seals, or combinations thereof. FIGS. 4a-d show some possible torque shoulders configurations in accordance with the invention. FIG. 4A shows a square torque shoulder, or one in which the pin and box members each have a 90° torque shoulder. FIG. 4b shows a angled torque shoulder, or one in which the pin and box members each have a torque shoulder with an angle other than 90° that is matched with the other such that the faces of the torque shoulders are in parallel contact.

Figure 4C:
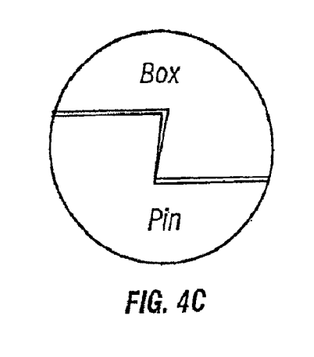
FIG. 4c shows a torque shoulder in accordance with embodiments of the present disclosure.
Figure 4D:
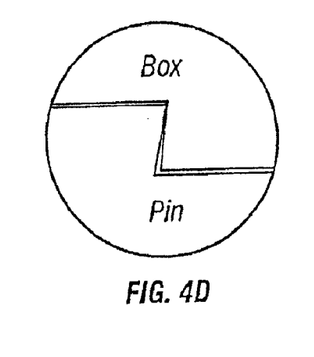
FIG. 4d shows a torque shoulder in accordance with embodiments of the present disclosure.

FIGS. 4c and 4d show torque shoulder configurations with mismatched angles.

Torque shoulders with mismatched angles include either the pin or box member having a torque shoulder with a larger angle than the complementary torque shoulder such that the faces of the torque shoulder are not in parallel contact. FIG. 4c shows a configuration where the pin member has a torque shoulder with a larger angle than the torque shoulder on the box member. FIG. 4d shows a configuration where the box member has a torque shoulder with a larger angle than the torque shoulder on the pin member.

Figure 5A:
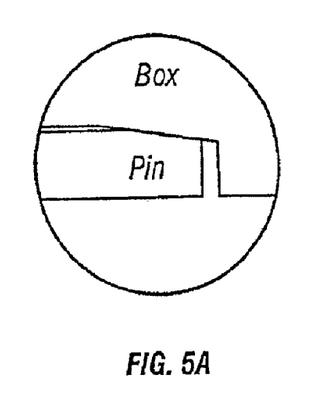
FIG. 5a shows a metal-to-metal seal in accordance with embodiments of the present disclosure.
Figure 5B:
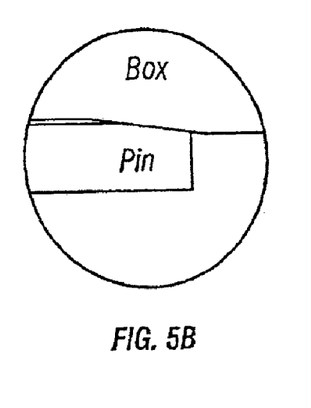
FIG. 5b shows a metal-to-metal seal in accordance with embodiments of the present disclosure.
Figure 5C:
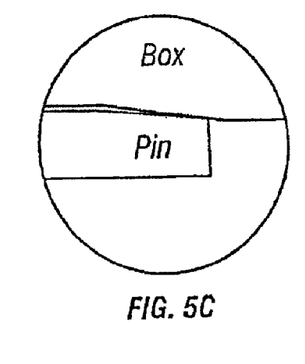
FIG. 5c shows a metal-to-metal seal in accordance with embodiments of the present disclosure.
Figure 5D:
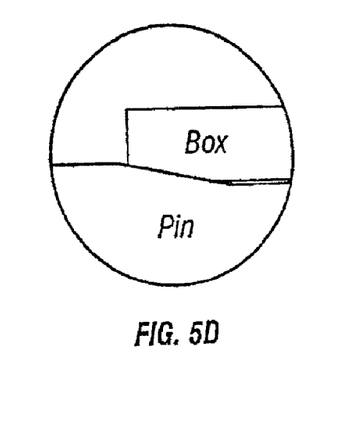
FIG. 5d shows a metal-to-metal seal in accordance with embodiments of the present disclosure.
Figure 5E:
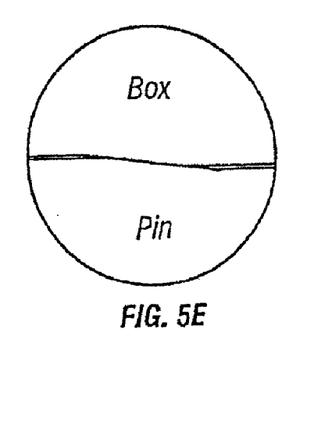
FIG. 5e shows a metal-to-metal seal in accordance with embodiments of the present disclosure.

FIGS. 5a-e show metal-to-metal seals in accordance with embodiments of the invention. Metal-to-metal seal can exist at the pin nose/box ID, the box face/pin OD or on a two step thread form at the interface between the two steps. The metal-to-metal seals can be matched or mismatched. Matched metal-to-metal seals have contacting surfaces that are parallel to one another while mismatched metal-to-metal seals have contacting surfaces are not parallel to one another. FIG. 5a shows a matched metal-to-metal seal with an ID shoulder located at the pin nose/box ID. FIG. 5b shows a matched metal-to-metal seal with an open bore at the pin nose/box ID. FIG. 5c shows a mismatched metal-to-metal seal with an open bore at the pin nose/box ID. FIG. 5d shows a matched metal-to-metal seal contact without an OD shoulder at the box face/pin OD. FIG. 5e shows a matched metal-to-metal seal on a two step thread form at the interface between the two steps. It will be understood by those skilled in the art that a matched or mismatched metal-to-metal seal may be located at any of the shown locations. It will be further understood that whether an ID shoulder or OD shoulder is included is a matter of design choice.

Figure 6A:
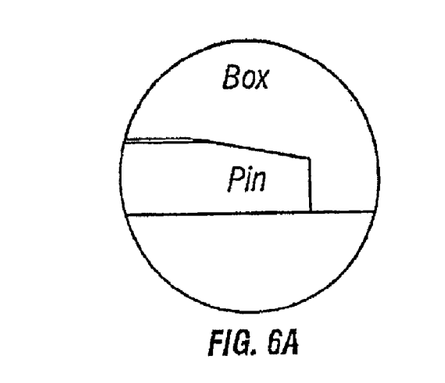
FIG. 6a shows a combination of a torque shoulder with a metal-to-metal seal in accordance with embodiments of the present disclosure.
Figure 6B:
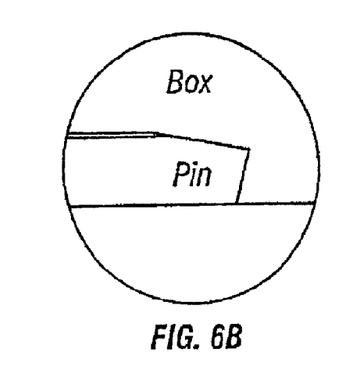
FIG. 6b shows a combination of a torque shoulder with a metal-to-metal seal in accordance with embodiments of the present disclosure.
Figure 6C:
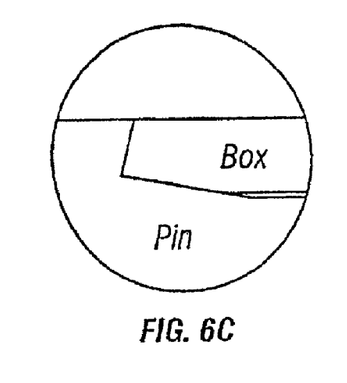
FIG. 6c shows a combination of a torque shoulder with a metal-to-metal seal in accordance with embodiments of the present disclosure.
Figure 6D:
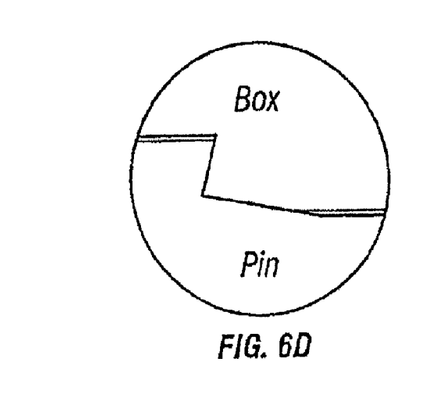
FIG. 6d shows a combination of a torque shoulder with a metal-to-metal seal in accordance with embodiments of the present disclosure.
Figure 6E:
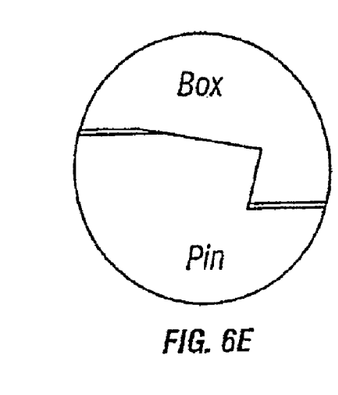
FIG. 6e shows a combination of a torque shoulder with a metal-to-metal seal in accordance with embodiments of the present disclosure.
Figure 6F:
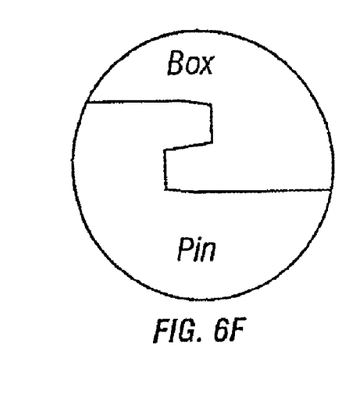
FIG. 6f shows a combination of a torque shoulder with a metal-to-metal seal in accordance with embodiments of the present disclosure.

FIGS. 6a-f show metal-to-metal seals implemented in conjunction with torque shoulders in accordance with embodiments of the invention. FIG. 6a shows a matched metal-to-metal seal with an adjacent square torque shoulder at the pin nose/box ID. FIG. 6b shows a matched metal-to-metal seal at the pin nose/box ID with an adjacent reverse angle torque shoulder. FIG. 6c shows a matched metal-to-metal seal at the box face/pin OD with an adjacent reverse angle torque shoulder. FIG. 6d shows a two-step thread form having a matched metal-to-metal seal on the smaller step with an adjacent reverse angle torque shoulder at the interface between the two steps. FIG. 6e a two-step thread form having a matched metal-to-metal seal on the larger step with an adjacent reverse angle torque shoulder at the interface between the two steps. FIG. 6f shows a two-step thread form having a series of matched metal-to-metal seals in an S-shaped configuration with adjacent square and reverse angle torque shoulders located at the interface between the two steps. It will be understood by those skilled in the art that the configurations described above are exemplary and the features shown therein can be combined in different variations without departing from the scope of the invention. Further, it will be understood by those skilled in the art that whether the metal-to-metal seal is matched or mismatched and whether the torque shoulder is square, reverse angled, or otherwise is a matter of design choice.

The torque shoulders disclosed can incorporate various types of sealing mechanisms. A typical metal-to-metal seal, hook shoulder, square shoulder with frustrum (conical or line-contact), and annular shoulder seals. Locked double-shoulder metal-to-metal seals incorporated into the torque shoulder. Elastomeric seals, especially including an elastomeric seal in the groove of a double-shoulder seal configuration. Geometries of the elastomeric seal and groove are designed to insure extrusion of the seal material at make-up. Double-shoulder thermoset resin seal (described below) Certain types of seals, notably the locked double-shoulder metal-to-metal seal located at the torque shoulder, require a high degree of centering action to engage properly and make an effective seal. The progressive engagement feature of the wedge thread (root/crest, then both flanks, in a prescribed order) is an effective means of centering the connection for these types of sealing mechanisms.

Figure 7:
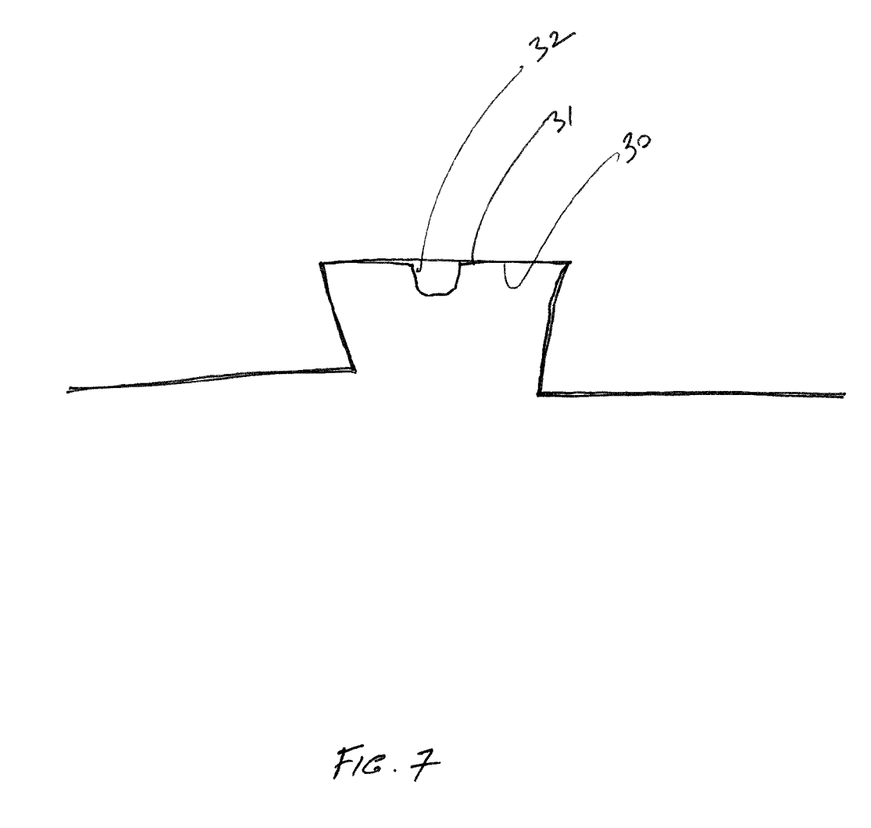
FIG. 7 shows a cross-section view of a helical relief groove located at a root/crest interface in accordance with embodiments of the present disclosure.

In one or more embodiments as shown in FIG. 7, for certain applications, a helical relief groove 32 is located at the root 30/crest 31 interface to insure that pipe-dope entrapment does not plastically deform the connection during power-tight make-up. When made-up power-tight, the locked double-shoulder metal-to-metal seal may, due to the sequence of sealing of metal-to-metal seals, trap pipe dope within the confines of the seal and develop extremely high hydraulic pressures. Experience with a similar configuration in a two-step wedge thread has revealed that some means to relieve the hydraulic pressure is required to prevent deleterious plastic deformation of the connection in such a situation.

A helical relief groove may be placed in the root/crest and extend into the double-shoulder seal to provide an escape path for trapped pipe-dope. Additionally, the sealing sequence at power-tight make-up may be altered so that the seals engage starting from the axial centerline of the connection and working outwards. Sealing in this fashion insures that trapped pipe-dope will migrate radially outward towards the helical pressure relief groove.

A double-shoulder thermoset resin seal can be accomplished with loose-fitting double-shoulder grooves, one of which is filled with low temperature thermoset resin (such as epoxy or phenoloc resins), capped and retained in the groove by a "doughnut" of thin thermoplastic tubing filled with fast-reacting catalyst. When the connection is made-up power-tight, the elements of the double-shoulder seal mesh together axially, rupturing the catalyst "doughnut" and causing the resin to set.

The invention has many distinct advantages over the prior art. A wedge thread design is disclosed that incorporates the basic functions of a prior art wedge thread configured with a positive stop torque shoulder. Typically, this invention is used in conjunction with a conical metal-to-metal seal, but is not limited to it. In one embodiment, in one aspect, the invention offers a positive stop torque shoulder that can work in conjunction with the wedge thread torque stop as a primary torque shoulder. In one embodiment, in one aspect, the invention offers a positive stop torque shoulder that can work in conjunction with the wedge thread torque stop as a secondary torque shoulder. In one embodiment, in one aspect, the invention offers a positive stop torque shoulder that can work independent of the wedge thread as a torque shoulder when the connection is made up.

As used herein, and as conventionally understood where tubular joints are being connected in a vertical position such as when making up a pipe string for lowering into a well bore, the term "load flank" designates the side wall surface of a thread that faces away from the outer end of the respective pin or box member on which the thread is formed and supports the weight of the lower tubular member hanging in the well bore. The term "stab flank" designates that side wall surface of the thread that faces toward the outer end of the respective pin or box member and supports the weight of the upper tubular member during the initial make-up of the joint.

Because many possible embodiments may be made of the invention without departing from the scope thereof, it is to be understood that all matter herein set forth or shown in the accompanying drawings is to be interpreted as illustrative and not in a limiting sense.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed is:

1. A threaded pipe connection comprising:
    a pin member having an external thread increasing in width in one direction;
    a box member having an internal thread increasing in width in an opposite direction so that complementary internal and external threads move into engagement upon make-up of the connection;
    a first contact zone located near a distal end of the pin member, the first contact zone comprising at least a portion of a contact surface of the pin member that is not parallel to a flat contact surface of the box member; and
    a second contact zone located near a distal end of the box member, the second contact zone comprising at least a portion of a contact surface of the box member that is not parallel to a flat contact surface of the pin member;

wherein at a final makeup of the connection, at least one of the distal end of the pin member does not engage with the box member and the distal end of the box member does not engage with the pin member.

2. The threaded connection of claim 1, further comprising a third contact zone located substantially near a central portion of the internal and external threads.

3. The threaded connection of claim 2, the third contact zone comprising at least a portion of a contact surface of the pin member that is not parallel to a flat contact surface of the box member.

4. The threaded connection of claim 1, further comprising a groove located at a root/crest interface of the internal and external threads that extends along a helical path of the internal and external threads.

5. The threaded connection of claim 1, wherein the first and second contact zone is configured as a metal-to-metal seal.

6. The threaded connection of claim 1, wherein the external thread of the pin member and the internal thread of the box member are formed on a substantially single taper.

* * * * *